(12) United States Patent
Kobayashi et al.

(10) Patent No.: US 7,965,177 B2
(45) Date of Patent: Jun. 21, 2011

(54) DISPLAY SYSTEM, SCREEN DESIGN SETTING TOOL, DISPLAY SYSTEM PROGRAM, SCREEN DESIGN SETTING PROGRAM, AND RECORDING MEDIUM

(75) Inventors: Masaki Kobayashi, Yamatokoriyama (JP); Fumiaki Fujimoto, Nara (JP); Toshiya Okamoto, Soraku-gun (JP); Toshiya Aoki, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 368 days.

(21) Appl. No.: 12/066,843

(22) PCT Filed: Jul. 3, 2006

(86) PCT No.: PCT/JP2006/313250
§ 371 (c)(1),
(2), (4) Date: Mar. 14, 2008

(87) PCT Pub. No.: WO2007/032139
PCT Pub. Date: Mar. 22, 2007

(65) Prior Publication Data
US 2009/0102632 A1    Apr. 23, 2009

(30) Foreign Application Priority Data

Sep. 16, 2005   (JP) ................. 2005-271228

(51) Int. Cl.
*G09F 9/00* (2006.01)
*G09F 9/30* (2006.01)
*B60Q 1/00* (2006.01)
*G08B 3/00* (2006.01)

(52) U.S. Cl. ........ 340/461; 340/438; 340/441; 340/462; 340/691.6; 340/995.17

(58) Field of Classification Search .................. 340/438, 340/441, 461, 462, 691.6, 815.4, 995.1, 995.14, 340/995.16, 995.27, 995.28, 995.17
See application file for complete search history.

(56) References Cited

U.S. PATENT DOCUMENTS

| 5,376,917 | A  | * | 12/1994 | Yoshimoto et al. | 340/438 |
| 6,157,297 | A  | * | 12/2000 | Nakai | 340/461 |
| 6,603,393 | B2 | * | 8/2003 | Sumada et al. | 340/425.5 |
| 7,463,281 | B2 | * | 12/2008 | Luskin et al. | 348/148 |

FOREIGN PATENT DOCUMENTS

CN        1618647 A       5/2005

(Continued)

OTHER PUBLICATIONS

Nakamura et al. JP6-195056, Jul. 1994.*
Official communication issued in the International Application No. PCT/JP2006/313250; mailed on Aug. 22 2006.

(Continued)

*Primary Examiner* — Daniel Wu
*Assistant Examiner* — Mark Rushing
(74) *Attorney, Agent, or Firm* — Keating & Bennett, LLP

(57) ABSTRACT

A display system includes a combination image dividing section arranged to divide a single combination image composed of a plurality of item images into a plurality of image blocks such that each of the image blocks has an item image; an image inputting controlling section arranged to lay out the individual image blocks; and an image inputting controlling section arranged to generate display data based on the image blocks laid out thereby. This can achieve a display system, to be mounted in the maneuverable moving object and having high degrees of freedom for screen layout, at a lower cost.

9 Claims, 7 Drawing Sheets

FOREIGN PATENT DOCUMENTS

| | | | |
|---|---|---|---|
| JP | 10-297318 | A | 11/1998 |
| JP | 2000-238552 | A | 9/2000 |
| JP | 2004-42684 | A | 2/2004 |
| JP | 2004-155395 | A | 6/2004 |

OTHER PUBLICATIONS

Official Communication issued in corresponding Chinese Patent Application No. 200680033935.3, mailed on Apr. 6, 2010.

* cited by examiner

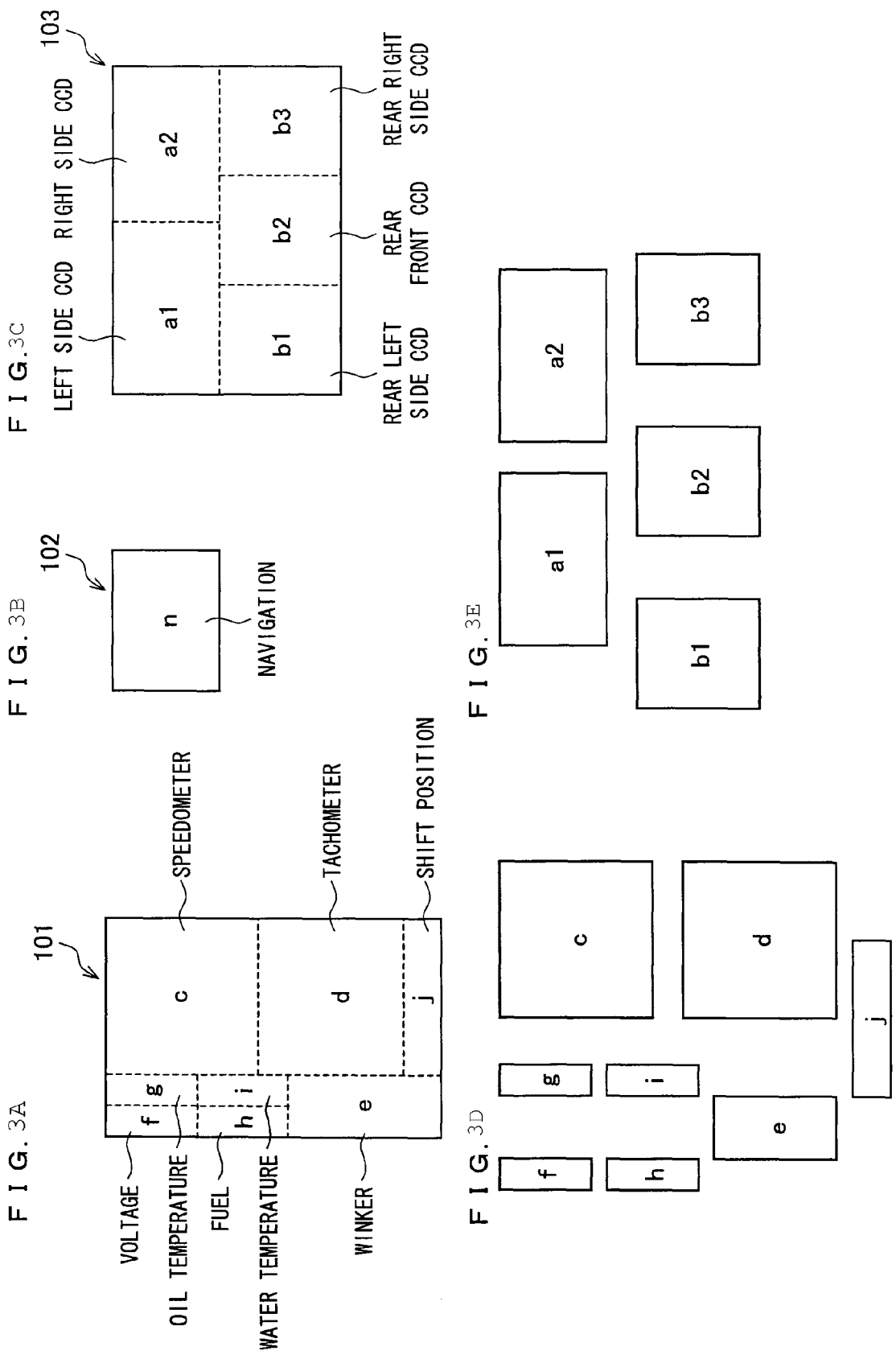

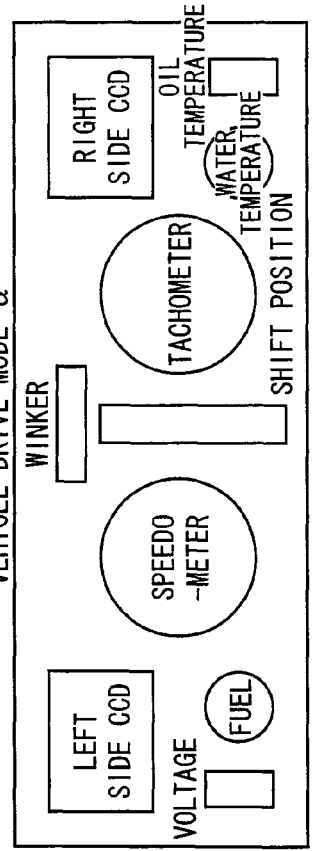
F I G. 4A
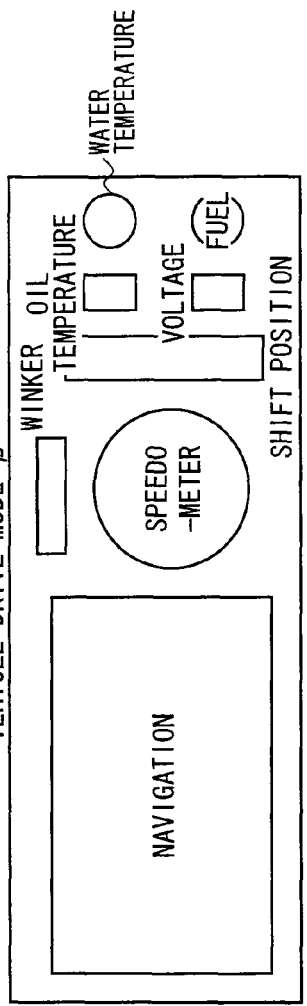
F I G. 4D
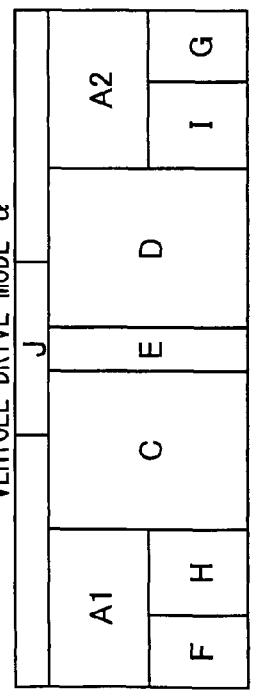
F I G. 4B
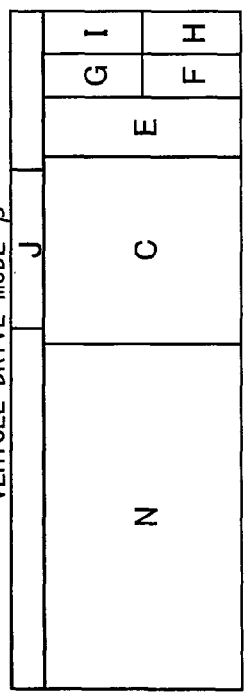
F I G. 4E
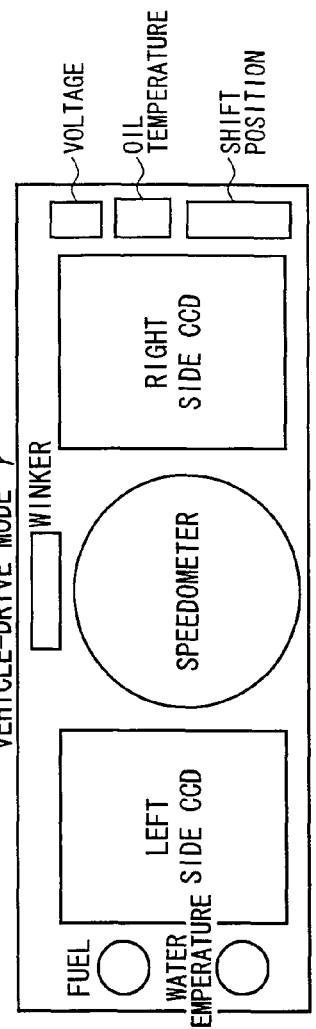
F I G. 4C
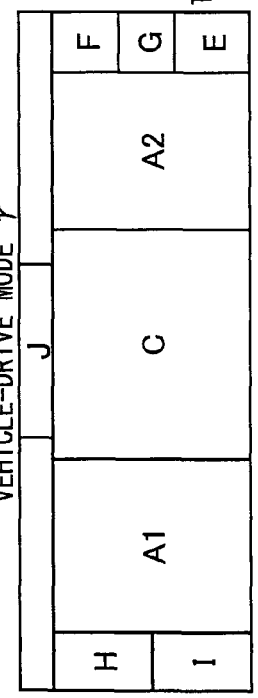
F I G. 4F

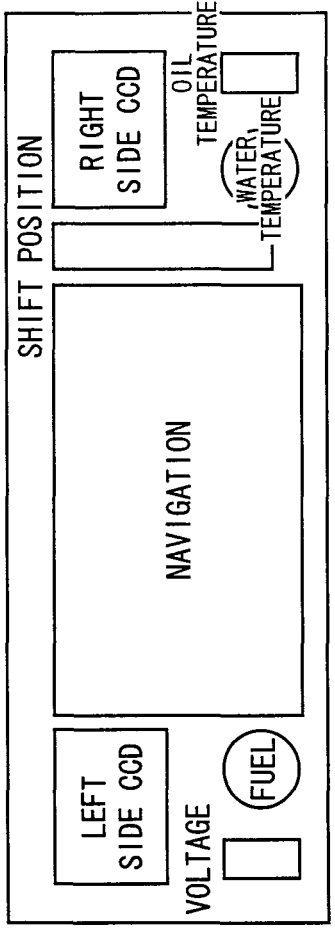
FIG. 5A  VEHICLE-STOPPING MODE
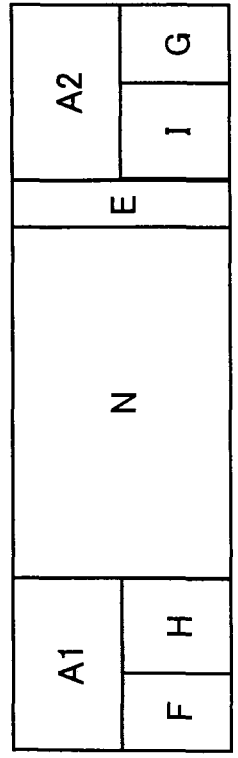
FIG. 5B  VEHICLE-REVERSING MODE
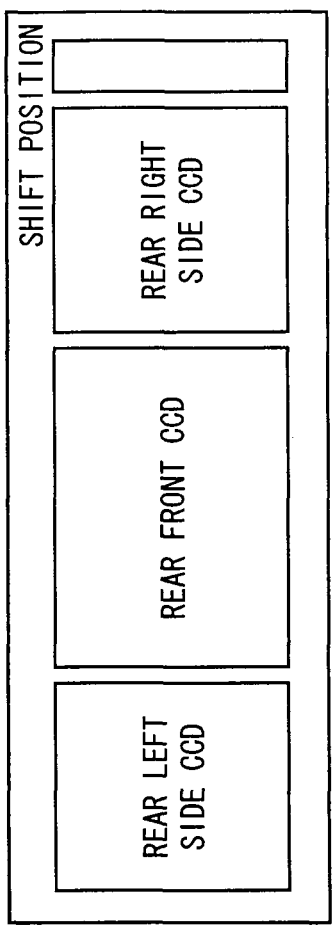
FIG. 5C  VEHICLE-STOPPING MODE
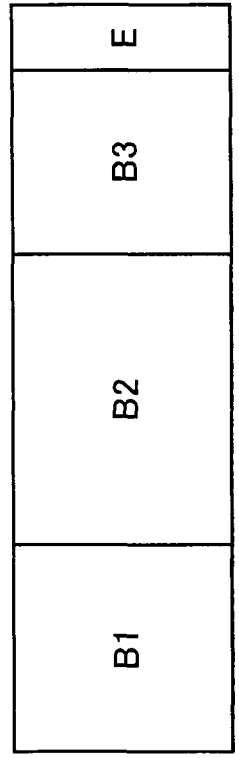
FIG. 5D  VEHICLE-REVERSING MODE

DISPLAY SYSTEM, SCREEN DESIGN SETTING TOOL, DISPLAY SYSTEM PROGRAM, SCREEN DESIGN SETTING PROGRAM, AND RECORDING MEDIUM

BACKGROUND OF THE INVENTION

1. Field of the Invention

The present invention relates to a display system (e.g., a display system for use with an instrument panel) mounted on a moving object (such as a vehicle), which is maneuverable.

2. Description of the Related Art

Recently, a display system that displays, on a display (a display section), an image in addition to images of vehicle information including a traveling speed and engine rotation frequencies has been proposed as a display system mounted in an instrument panel of an automobile or the like. The image additionally displayed on the display system may be an image of navigation, TV, or DVD or an image captured by a camera (CCD) mounted on a vehicle. High degrees of freedom for screen layout are required of those display systems such that vehicle safety can be increased by displaying, based on a vehicle condition, necessary information in an easily viewable manner or such that users' (vehicle manufacturers and drivers) requirements can be met.

Japanese Unexamined Patent Application Publication, Tokukai-Hei, 10-297318 discloses a method for laying out individual images showing vehicle information and the like with high degrees of freedom. However, in order to perform it, a graphics display controller (GDC) must be provided for each image (e.g., images of a speedometer and tachometer), and image data from each graphics display controller respectively must be inputted and displayed.

However, as the number of images to be displayed and data sizes thereof have increased recently, the number of required graphics display controllers has increased; higher processing capacities have been required; and input systems have become more complex, all of which have led to an issue that the cost of the entire display system significantly increases.

SUMMARY OF THE INVENTION

In order to overcome the problems described above, preferred embodiments of the present invention provide a display system, which can be mounted in a mobile object and has high degrees of freedom for screen layout, and has a lower cost.

That is, the display system according to a preferred embodiment of the present invention, which may be mounted in a maneuverable moving object and displays an image for presenting plural pieces of information including information regarding the moving object, includes a combination image division section arranged to divide a single combination image composed of a plurality of item images into a plurality of image blocks such that each image block has at least one of the item images; and a display data generation section arranged to lay out the individual image blocks so as to generate display data.

According to the above configuration, the combination image division section cuts out individual item images as independent image blocks from the single combination image; and the display data generation section freely lays out each of the image blocks, so as to generate display data. Consequently, without modifying (e.g., adding a GDC) an image generating section (in other words, with the cost being curbed), the degrees of freedom for screen layout can be increased. Furthermore, according to the above configuration, it is possible that at first, a plurality of item images be inputted as the single image closely composed thereof, and then divided and freely laid out. Therefore, the size of the data to be transmitted and inputted can be decreased, compared to a configuration in which individual item images are laid out first, and then transmitted and inputted. Consequently, efficiency of data processing can be enhanced and hardware can be downsized.

According to the present display system, the display data generation section preferably arranges the individual image blocks in predetermined forms and positions. This can further increase the degrees of freedom for screen layout.

In addition, according to the present display system, the display data generation section may lay out the image blocks based on screen layout data determining forms and positions thereof. Thus, in a case that the screen layout data is configured to be optionally set up by a user (vehicle manufacturers and drivers), the user will freely set up a preferred screen, and therefore will become more satisfied. Besides, the screen layout data may also be set up based on a condition of the moving object. As a result, a driver can acquire adequate information based on the condition of the moving object, and be more satisfied.

Also, the display system according to a preferred embodiment of the present invention, which is to be mounted in the maneuverable moving object and displays an image for presenting plural pieces of information including information regarding the moving object, generates data for displaying the image from image data of a single combination image composed of a plurality of item images, cuts out the individual item image as image blocks therefrom, and lays out the individual image blocks. In this case, the image blocks are preferably laid out in the forms and positions based on the screen layout data.

A display system program according to another preferred embodiment of the present invention causes a computer to perform the above steps.

In addition, a computer readable recording medium according to a further preferred embodiment of the present invention has the display system program recorded thereon.

Furthermore, a screen design setting tool for use in the display system to be mounted in the moving object, which display system generates display data by dividing a single combination image composed of a plurality of item images into a plurality of image blocks such that each image block has at least one of the item images, and lays out the individual image blocks, includes a screen design creation section arranged to set up the forms and positions of the individual item images based on a user's input; a screen design data generation section arranged to generate screen design data (image data, screen layout data, etc. of each item image) from the forms and positions of the individual item images; and a recording section arranged to record the screen design data in the display system.

Moreover, the screen design setting tool for use in the display system, which generates display data by cutting out a single combination image composed of a plurality of item images into a plurality of image blocks such that each of the image blocks has at least one of the item images and laying out the individual image blocks, generates screen design data based on forms and positions of each image that are gained through the user's input, and stores the screen design data in the display system.

The screen design setting program according to another preferred embodiment of the present invention causes a computer to perform each of the functions of the screen design setting tool.

Furthermore, a computer-readable recording medium according to yet another preferred embodiment of the present invention has the screen design setting program recorded thereon.

As described above, according to the display system of various preferred embodiments of the present invention, the combination image division section cuts out individual item images as independent images from a single combination image; and the display data generation section freely lays out each of the item images so as to generate display data. Consequently, without modifying (adding a GDC, etc.) the image generating section (in other words, with the cost being curbed), the degrees of freedom for screen layout can be increased.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3A is a view schematically illustrating a combination image.

FIG. 3B is a view schematically illustrating an amenity image.

FIG. 3C is a view schematically illustrating a combination image.

FIG. 3D is a view schematically illustrating a group of image blocks gained by dividing the combination image illustrated in FIG. 3A.

FIG. 3E is a view schematically illustrating a group of image blocks gained by dividing the combination image illustrated in FIG. 3C.

FIG. 4A is a view schematically illustrating a layout of image blocks corresponding to a vehicle-drive mode α.

FIG. 4B is a view schematically illustrating a layout of image blocks corresponding to a vehicle-drive mode β.

FIG. 4C is a view schematically illustrating a layout of image blocks corresponding to a vehicle-drive mode γ.

FIG. 4D is a view schematically illustrating a screen configuration corresponding to the vehicle-drive mode α.

FIG. 4E is a view schematically illustrating a screen configuration corresponding to the vehicle-drive mode β.

FIG. 4F is a view schematically illustrating a screen configuration corresponding to the vehicle-drive mode γ.

FIG. 5A is a view schematically illustrating a layout of individual image blocks corresponding to a vehicle-stopping mode.

FIG. 5B is a view schematically illustrating a layout of individual image blocks corresponding to a vehicle-reversing mode.

FIG. 5C is a view schematically illustrating a screen configuration corresponding to the vehicle-stopping mode.

FIG. 5D is a view schematically illustrating a screen configuration corresponding to the vehicle-reversing mode.

DETAILED DESCRIPTION OF THE PREFERRED EMBODIMENTS

Preferred embodiments of the present invention are described below with reference to FIGS. 1 to 7.

Figure 2:
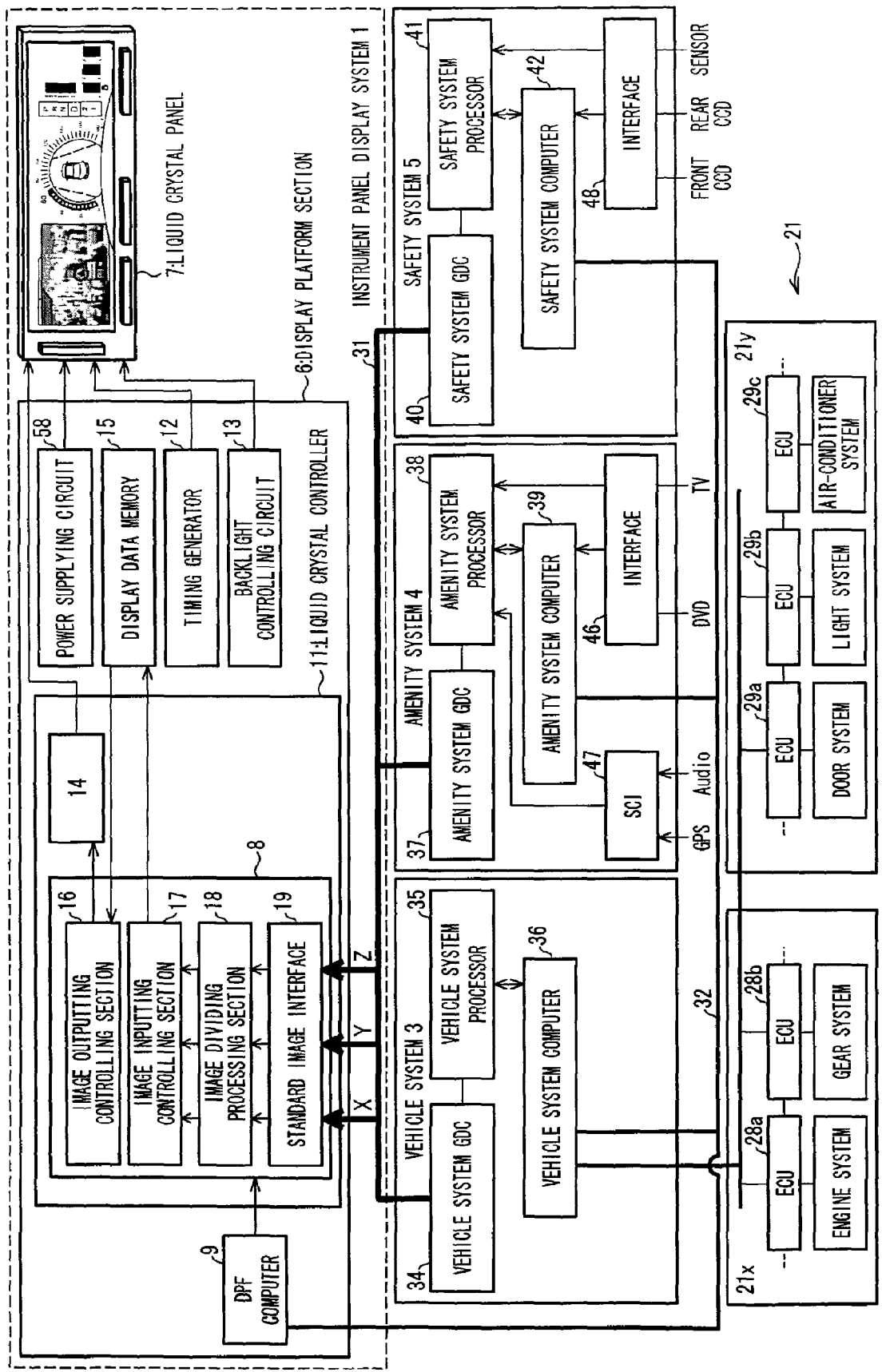
FIG. 2 is a block diagram illustrating a configuration of an instrument panel control system including the instrument panel display system of FIG. 1.

FIG. 2 is a block diagram illustrating an instrument panel control system of the present preferred embodiment. As FIG. 2 illustrates, the present instrument panel control system includes an instrument panel display system 1, an input/output system of an amenity system (an amenity system 4) for amenity content such as DVD, TV, GPS, Audio and the like, an input/output system of a safety system (a safety system 5) for safety content such as various types of CCD and a sensor, and an in-car LAN 21 for transmitting vehicle data. The in-car LAN 21 includes a power train system in-car LAN 21x and a body system in-car LAN 21y. To the power train system in-car LAN 21x, an electric controlling unit (ECU) 28a for controlling an engine system, an electric controlling unit (ECU) 28b for controlling a gear system, etc., are connected. Furthermore, to the body system in-car LAN 21y, an electric controlling unit (ECU) 29a for controlling a door system, an electric controlling unit (ECU) 29b for controlling a light system, an electric controlling unit (ECU) 29c for controlling an air-conditioner system, etc., are connected.

The instrument panel display system 1 includes a display platform section 6 and a liquid crystal panel 7. The display platform section 6 includes a display platform computer 9 (hereafter DPF computer 9), a liquid crystal controller 11, a display data memory 15, a power supplying circuit 58, a timing generator 12, and a backlight controlling circuit 13. Besides, the liquid crystal controller 11 includes a liquid crystal image quality improving circuit 14 and a multi-display real-time processing circuit 8 that further includes a standard image interface 19, an image dividing processing section 18, an image inputting controlling section 17, and an image outputting controlling section 16.

A vehicle system 3 includes a vehicle system graphics display controller 34 (hereafter a vehicle system GDC 34), a vehicle system processor 35 (a CPU, a processor), and a vehicle system computer 36 corresponding to the in-car LAN. An amenity system 4 includes an amenity system graphics display controller 37 (hereafter an amenity system GDC 37), an amenity system processor 38 (a CPU, a processor), and an amenity system computer 39 compatible with the in-car LAN. In addition, a safety system 5 includes a safety system image display controller 40 (hereafter a safety system GDC 40), a safety system processor 41 (a CPU, a processor), and a safety system computer 42 corresponding to the in-car LAN.

Here, the vehicle system computer 36 is connected to the in-car LAN 21 for transmitting vehicle data (the power train system in-car LAN 21x and the body system in-car LAN 21y). Also, the DPF computer 9 of the display platform section 6, the vehicle system computer 36 of the vehicle system 3, the amenity system computer 39 of the amenity system 4, and the safety system computer 42 of the safety system 5 are connected to the in-car LAN 32 for transmitting display control data.

Furthermore, the vehicle system GDC 34, the amenity system GDC 37, the safety system GDC 40, and the standard image interface 19 of the display platform section 6 are connected to the in-car LAN 31 for transmitting image data. The in-car LAN 31 is a high speed LAN (e.g., MOST, IDB1394) and a transmission channel connecting the display platform section 6 to the GDCs of each system (34, 37, and 40) through a connector(s). The in-car LAN 31 may include special lines connecting the display platform section 6 with each system, respectively.

Functions of the in-car LAN 21 for transmitting vehicle data, the vehicle system 3, the amenity system 4, the safety system 5, and the instrument panel section 2 are described below.

To the power train system in-car LAN 21x of the in-car LAN 21, the engine system ECU 28a, the gear system ECU 28b, etc., are connected. The engine system ECU 28a performs control of an engine, transmission of numeric data thereof, reception of control data from other ECUs, and other operations. The gear system ECU 28b performs controls of gears, transmission of numerical data thereof, reception of control data from other ECUs, and other operations. Then, data of warning information, a blinker, a speed, and a rotation frequency (real-time data which are required to be transmitted real-time and to be high reliable) are transmitted as vehicle data from the power train system in-car LAN 21x to the vehicle system computer 36 of the vehicle system 3.

To the body system in-car LAN 21y of the in-car LAN 21, the door system ECU 29a, the light system ECU 29b, the air-conditioner system ECU 29c, etc., are connected. The door system ECU 29a performs transmission of a door opening/closing signal, reception of control data from other ECUs, and other operations. The light system ECU 29b performs transmission of a signal for turning on/off lights, reception of control data from other ECUs, and other operations. The air-conditioner system ECU 29c performs transmission of data for controlling the air-conditioner as well as data of air-conditioner, reception of control data from other ECUs, and other operations. Thus, data of door opening/closing, lights, air-conditioner control, etc. (data not having any problems with being transmitted at lower speed) are transmitted from the body system in-car LAN 21y as vehicle data to the vehicle system computer 36 of the vehicle system 3.

The vehicle system computer 36 of the vehicle system 3 is a computer including an interface for the LANs (local area networks), which are automobile LANs such as CAN, LIN, FlexRay, and/or the like.

The vehicle system computer 36 transmits various types of vehicle data received from the in-car LAN 21 (data of a direct advance, a stop, a right turn, a left turn, a reverse, a traveling speed, etc.), to the amenity system computer 39, the safety system computer 42, and DPF computer 9 of the display platform section 6 through the in-car LAN 32 for transmitting display control data.

In addition, the vehicle system computer 36 transmits to the vehicle system processor 35, various vehicle data (such as data of the power train system, and data of the body system) received from the in-car LAN 21 for transmitting vehicle data, and also transmits to the in-car LAN 32, image output control data (described later) generated by the vehicle system processor 35.

The vehicle system processor 35 receives various vehicle data transmitted through the vehicle system computer 36 and uses the vehicle system GDC 34 so as to generate (a) the image data of the combination image and (b) the image output control data for controlling the switching of the images and the layouts, and then transmits the data to the vehicle system computer 36. Here, the combination image is the single piece of image where item images of the speedometer, tachometer, shift lever position, fuel indicator, water temperature, oil temperature, oil pressure, voltage, etc., are arranged in predetermined sizes and positions. The item images are images generated for each item of information to be displayed (such as information of vehicle, its surroundings, etc.) so that the information is presented visually.

The vehicle system GDC 34 generates the combination image according to instructions from the vehicle system processor 35, and transmits the image data thereof to the in-car LAN 31 for transmitting image data.

The amenity system computer 39 of the amenity system 4 is a computer including an interface for the LANs, which are automobile LANs, such as CAN, LIN, FlexRay and/or the like, receives vehicle data transmitted from the vehicle system computer 36 through the in-car LAN 32, and transmits the vehicle data to the amenity system processor 38. In addition, the amenity system computer 39 transmits the image output control data (described later) generated at the amenity system processor 38 to the in-car LAN 32 for transmitting display control data.

The amenity system processor 38 receives vehicle data transmitted from the amenity system computer 39, data transmitted from DVD or TV through the interface 46, and data transmitted from GPS and Audio through SCI 47, and then generates (a) image data of amenity image (graphics of navigation, TV, DVD, etc.) by using the amenity system GDC 37, and (b) the image output control data for controlling the switching of the images or of the layouts; and transmits the data to the amenity system computer 39. The image data corresponding to navigation images is generated by combining map data from DVD with information of a vehicle position from GPS.

The amenity system GDC 37 generates amenity image according to instructions from the amenity system processor 38, and transmits the image data thereof to the in-car LAN 31 for transmitting image data.

The safety system computer 42 of the safety system 5 is a computer including an interface for the LANs, which are automobile LANs, such as CAN, LIN, FlexRay and/or the like, receives the vehicle data transmitted from the vehicle system computer 36 through the in-car LAN 32, and transmits that vehicle data to the safety system processor 41. In addition, the safety system computer 42 of the safety system 5 transmits the image output control data (described later) generated at the safety system processor 41 to the in-car LAN 32 for transmitting display control data.

The safety system processor 41 of the safety system 5 receives vehicle data transmitted from the safety system computer 42 and data transmitted through the interface 48 from a front CCD, a rear CCD, or various types of sensors, and then generates (a) image data of the combination image (the single piece of image where the item images of various types of CCDs, warning images, etc. are arranged in the predetermined sizes and positional relationships) by using the safety system GDC 40, and (b) the image output control data for controlling the switching of the images and of the layouts; and transmits the data to the safety system computer 42. The warning image is generated based on safety detection processing, such as obstacle detecting and white line detecting, performed by various types of CCDs.

The safety system GDC 40 generates the combination image according to instructions from the safety system processor 41, and transmits the display data thereof to the in-car LAN 31 for transmitting image data.

The DPF computer 9 of the instrument panel display system 1 is a computer including an interface for the LANs, which are automobile LANs, such as CAN, LIN, FlexRay and/or the like, receives the image output control data transmitted to the in-car LAN 32 from the vehicle system computer 36, the amenity system computer 39, and the safety system computer 42, and inputs the data into the multi-display real-time processing circuit 8. In addition, the DPF computer 9 receives vehicle data transmitted from the vehicle system computer 36 to the in-car LAN 32, and inputs that vehicle data into the multi-display real-time processing circuit 8.

The liquid crystal panel 7 of the instrument panel display system 1 is a liquid crystal panel module including a driver IC, a backlight, and the like. The timing generator 12 generates a signal specific to a liquid crystal panel. The backlight controlling circuit 13 controls backlight of the liquid crystal panel 7. The power supplying circuit 58 applies power supply voltage to the liquid crystal panel 7. The display data memory 15 temporarily records and stores image data. In addition, the display data memory 15 is used for image processing or the like.

The liquid crystal controller 11 of the instrument panel display system 1 outputs the display data to the liquid crystal panel 7. That is, the multi-display real-time processing circuit 8 generates data for display the image, based on (a) the image data of the combination image generated by the vehicle system 3, (b) the image data of the amenity image generated by the amenity system 4, (c) the image data of the combination image generated by the safety system 5, (d) the screen layout data preliminarily stored in the DPF computer 9, (e) the image output control data generated by each system (3, 4, and 5) and inputted through the DPF computer 9. Furthermore, the liquid crystal graphics improving circuit 14 (high quality displaying circuit) modifies the display data (improves image quality) to be suitable for characteristics of the liquid crystal panel 7, then outputs that display data to the liquid crystal panel 7.

Units of the multi-display real-time processing circuit 8 are further described as below.

From LANs for image data, such as MOST or IDB 1394, or from the special lines, such as LVDS, DVI, or HDMI, the standard image interface 19 receives: (a) the image data of the combination image generated by the vehicle system 3 through the channel X; (b) the image data of the amenity image through the channel Y; and (c) the image data of the combination image generated by the safety system 5 through the channel Z.

Furthermore, the image dividing processing section 18 divides the combination image generated by the vehicle system 3 into a plurality of image blocks. Here, information regarding sizes and positions of each image block is preliminarily stored in the DPF computer 9. According to that information, the image dividing processing section 18 cuts out the image blocks such that each image block has a single item image. Likewise, the image dividing processing section 18 divides the combination image generated by the safety system 5 into a plurality of image blocks. Again, information regarding sizes and positions of each image block is preliminarily stored in the DPF computer 9, and according to that information, the image dividing processing section 18 cuts out the image blocks such that each image block has a single item image.

Based on the screen layout data, the image inputting controlling section 17 modifies sizes (sets up horizontal to vertical ratios) of the image blocks of the combination image generated by the vehicle system 3, and also arranges the image blocks in positions based on the screen layout data. Then, the image inputting controlling section 17 writes down, into the display data memory 15, data thus prepared from the above processing. In addition, based on the screen layout data, the image inputting controlling section 17 modifies sizes (sets up horizontal to vertical ratios) of the amenity image generated by the amenity system 4, and also arranges the amenity image based on the screen layout data. Then, the image inputting controlling section 17 writes down, into the display data memory 15, data thus prepared from the above processing. Further, based on the screen layout data, the image inputting controlling section 17 modifies sizes of the individual image blocks of the combination image generated by the safety system 5, and also arranges the individual image blocks based on the screen layout data. Then, the image inputting controlling section 17 writes down, into the display data memory 15, data thus prepared from the above processing.

The image output controlling section 16 generates the display data so as to display a plurality of item images and amenity images simultaneously on the liquid crystal panel 7, based on the image data and the image output control data, wherein the image data is written down in the display data memory 15 by the image inputting controlling section 17 and the image output control data is inputted from individual systems (3, 4, and 5) through the in-car LAN 32 and the DPF computer 9. The display data is outputted to the liquid crystal panel 7 through the liquid crystal image quality improving circuit 14. As a result, a plurality of item images (images of the speedometer, tachometer, shift lever position, fuel indicator, water temperature, oil temperature, oil pressure, voltage, various type of CCD, warning icon, etc.) and the amenity images (images of navigation, TV, DVD, etc.) are simultaneously displayed, according to a drive condition of a vehicle, in the predetermined positions (positions determined based on the screen layout data) on the liquid crystal panel 7.

Figure 1:
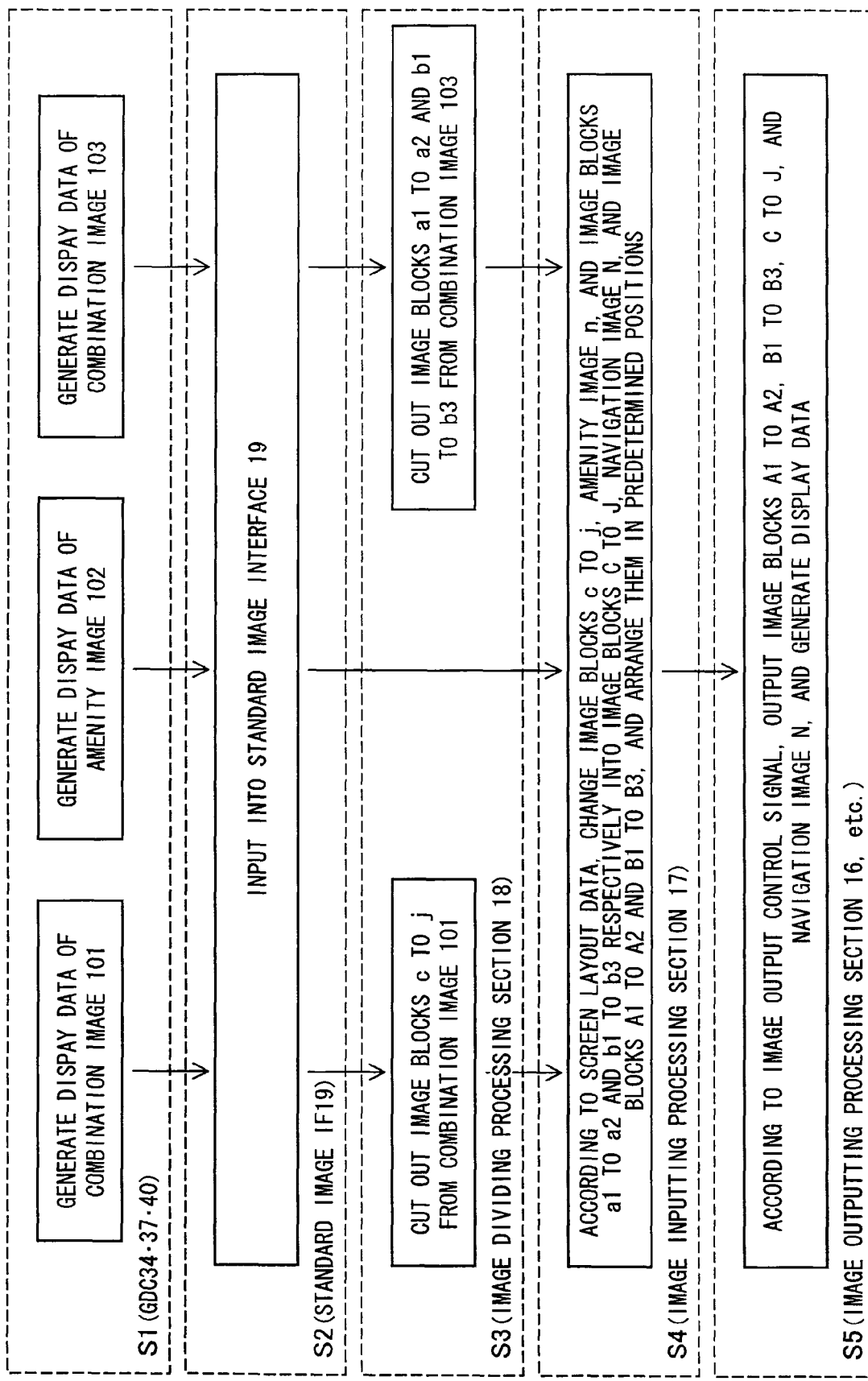
FIG. 1 is a flowchart illustrating a generation process of display data performed by an instrument panel display system according to a preferred embodiment of the present invention.

A process of display data generation in the present preferred embodiment is described below with reference to FIGS. 1, 3A to 3E, 4A to 4F, and 5A to 5D. FIG. 1 is a flowchart illustrating a process of display data generation of the present preferred embodiment. FIGS. 3A, 3B, and 3C are schematic views respectively illustrating combination images, amenity images and combination image while FIGS. 3D and 3E are views schematically illustrating groups of image blocks gained by dividing the combination images illustrated respectively by FIGS. 3A and 3C. Also, FIGS. 4A to 4C are views schematically illustrating layouts of image blocks corresponding to each vehicle-drive mode (α, β, and γ) while FIGS. 4D to 4F are views schematically illustrating screen configurations corresponding to the drive modes (α, β, and γ). In addition, FIGS. 5A and 5B are views schematically illustrating layouts of image blocks respectively corresponding to a vehicle-stopping mode and a vehicle-reversing mode while FIGS. 5C and 5D are views schematically illustrating screen configurations respectively corresponding to the vehicle-stopping mode and the vehicle-reversing mode.

As FIG. 1 illustrates, at first, the processors of each system generate single images by using GDCs (S1). That is, the vehicle system processor 35 generates a combination image 101 by using the vehicle system GDC 34. The combination image 101 is composed of a plurality of image blocks c to j configured in a predetermined layout that is indicated with dash lines in FIG. 3A. The image blocks c to j respectively correspond to the item image of the speedometer, tachometer, shift lever position, voltage, oil temperature, fuel indicator, water temperature, and blinker. The amenity system processor 38 generates an amenity image 102 by using the amenity system GDC 37, and the amenity image 102 includes a navigation screen n. The safety system processor 41 generates a combination image 103 by using the safety system GDC 40. The combination image 103 is composed of a plurality of image blocks a1 to a2 and b1 to b3, which are arranged in a predetermined layout indicated with dash lines in FIG. 3C. The image blocks a1 to a2 and b1 to b3 respectively correspond to item images of a left side CCD, right side CCD, rear left side CCD, rear front CCD, and rear right CCD.

Next, image data of the single images generated by each GDCs (34, 37, and 40) is inputted into the standard image quality interface 19 (S2).

Then, referring to the layouts of the image blocks, the image dividing processing section 18 cuts out the image blocks from the combination image generated at the GDCs (34 and 40) so as to divide the combination image into a plurality of independent images (S3). As described above, the layouts of the image blocks (sizes and positions thereof in the combination images) are preliminarily stored in the DPF computer 9. Accordingly, the image blocks c to j respectively corresponding to the images of the speedometer, tachometer, shift lever position, voltage, oil temperature, fuel indicator, water temperature, and blinker are independently converted into data from the combination image 101. Likewise, the image blocks a1 to a2 and b1 to b3 respectively corresponding to the image of the left side CCD, right side CCD, rear left side CCD, rear front CCD, rear right side CCD are independently converted into data from the combination image 103.

After that, based on the screen layout data, the image inputting controlling section 17 modifies the sizes (sets up horizontal to vertical ratios) of the image blocks generated at S3 and the navigation image n generated at S1, and also arranges the above images based thereon (S4). The screen layout data is preliminarily stored in the DPF computer 9; and determines according to the vehicle condition (e.g. running, stopping, or reversing), the forms and the sizes of the image blocks a1 to a2, b1 to b3, c to j, and the navigation image n on the displaying section of the liquid crystal panel 7. For example, when developing a screen for the vehicle-drive mode α (refer to FIG. 4D), the screen layout data modifies the image blocks a1 to a2 and c to j respectively into A1 to A2 and C to J, and arranges each of them as FIG. 4A illustrates. When developing a screen for the vehicle-drive mode β (refer to FIG. 4E), the screen layout data modifies the image blocks c, e to j, and the navigation image n respectively into C, E to J, and N, and arranges each of them as FIG. 4B illustrates. When developing a screen for the vehicle-drive mode γ (refer to FIG. 4F), the screen layout data modifies individual image blocks a1 to a2, c, and e to j respectively into A1 to A2, C, and E to J, and arranges each of them as FIG. 4C illustrates. When developing a screen for the vehicle-stopping mode (refer to FIG. 5C), the screen layout data modifies the image blocks a1 to a2, e to i, and the navigation image n respectively into A1 to A2, E to I, and N, and arranges each of them as FIG. 5A illustrates. When developing a screen for the vehicle-reversing mode (refer to FIG. 5D), the screen layout data modifies the image data b1 to b3 and e respectively into B1 to B3 and E, and arranges each of them as FIG. 5B illustrates.

Then, based on the image output control data, the image outputting controlling section 16 outputs the image blocks (A1 to A2, B1 to B3, and C to J) and the navigation image N, which are arranged at S4, so as to generate the display data for displaying the images simultaneously on the liquid crystal panel 7 (S5). The display data is outputted to the liquid crystal panel 7 through the liquid crystal image quality improving circuit 14, and is displayed, based on the screen layout data that is stored in the DPF computer 9 according to the vehicle condition, as FIGS. 4D to 4F, for example, illustrate when the vehicle is being driven; displayed as FIG. 5C, for example, illustrates when the vehicle is being stopped; and displayed as FIG. 5D, for example, illustrates when the vehicle is being reversed.

It should be noted that FIGS. 4D to 4F, 5C, and 5D illustrate exemplary screen developments. According to the present preferred embodiment, image blocks (a1 to a2, b1 to b3, c to j, etc.) and amenity images (navigation, TV, DVD, etc.) may be modified into desired sizes and arranged freely.

These screens may be developed by a user side (e.g., a vehicle manufacturer) with use of the screen design setting tool according to a preferred embodiment of the present invention, and recorded in the display platform section 6 as the screen design data including the image data and the screen layout data of each item image. Accordingly, the vehicle manufacturer side may: develop and then record any one of the screens illustrated by FIGS. 4D to 4F as the screen that is to be displayed while the vehicle is being driven (e.g., may set up the easily viewable screen illustrated by FIG. 4F in a case that an end user is a senior driver); store three of them such that screens automatically switch according to a vehicle condition, a weather condition, etc.; or allow a driver to manually switch the screens as the driver prefers.

Figure 6:
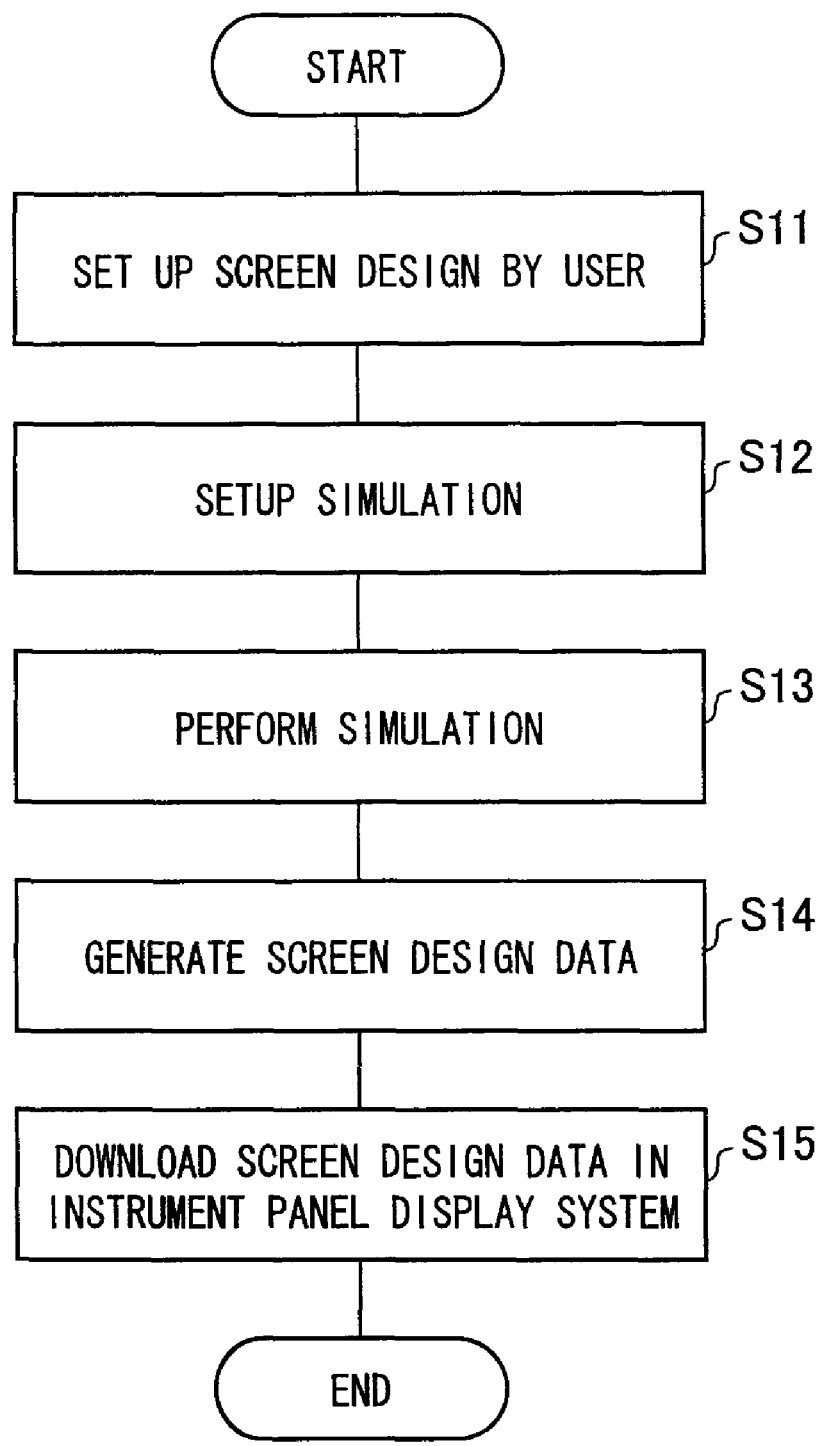
FIG. 6 is a flowchart illustrating a set-up process with use of a screen design setting tool.

Here, a set-up process by the screen design setting tool is described with reference to a flowchart illustrated in FIG. 6. The screen design setting tool includes a screen design setting section, a screen design data generating section, and a download executing section.

At first, based on an input by a user (e.g., vehicle manufacturer), the screen design setting section develops screens (screens preferred by the user) for each vehicle condition (running, stopping, and reversing) (S11). The step S11 may be arranged such that a screen of the same design is displayed while the vehicle is being driven, or such that, while the vehicle is being driven, different screens are displayed depending on vehicle conditions, such as the traveling speed, right turn, left turn, etc. or based on external conditions. In addition, a plurality of the screens may be developed for the driver to select. Much the same is true of the vehicle-stopping mode and vehicle-reversing mode. Once S11 is completed, conditions for simulating the developed screens are set up (vehicle conditions, etc. are set up) (S12). Then, simulation is conducted under the set-up conditions (S13). If there arises, as a result of the simulation, a necessity for adjustment, the set-up process returns to the S11 or S12. Once screens are set up at S13, the set-up process proceeds into S14, and the screen design data generating section develops the screen design data of each screen. The screen design data includes the image data of each item image including the speedometer, tachometer, shift lever position, voltage, oil temperature, fuel indicator, water temperature, blinker, etc. and the screen layout data determining sizes and positions thereof. At last, the download executing section downloads the screen design data into the display platform section 6 of the instrument panel display system 1 (S15). By this, the image data and the screen layout data of the item images of the screen, the screen developed freely by the user, are stored in the instrument panel display system 1.

As described above, according to the present preferred embodiment of the instrument panel display system 1, it is possible that the image dividing processing section 18 cuts out the item images as independent images from the single combination image; the image inputting controlling section 17 freely lays out each of the item images; and the image outputting controlling section 16 develops the display data thereof. Consequently, without modifying (e.g., adding a GDC) individual systems (3, 4, and 5), that is, with the cost being curbed, the degrees of freedom for screen layout can be increased.

Furthermore, according to the present preferred embodiment of the instrument panel display system 1, individual item images may be first inputted into the standard image interface 19 as the single image closely composed thereof, and then be divided and optionally laid out at the controlling sections of the multi-display real-time processing circuit 8. Consequently, compared to a configuration in which the individual item images are laid out first (arranged in different layouts), and then transmitted and inputted, the size of the data to be transmitted and inputted can be decreased. As a result, efficiency of data processing can be enhanced and hardware can be downsized.

Figure 7:
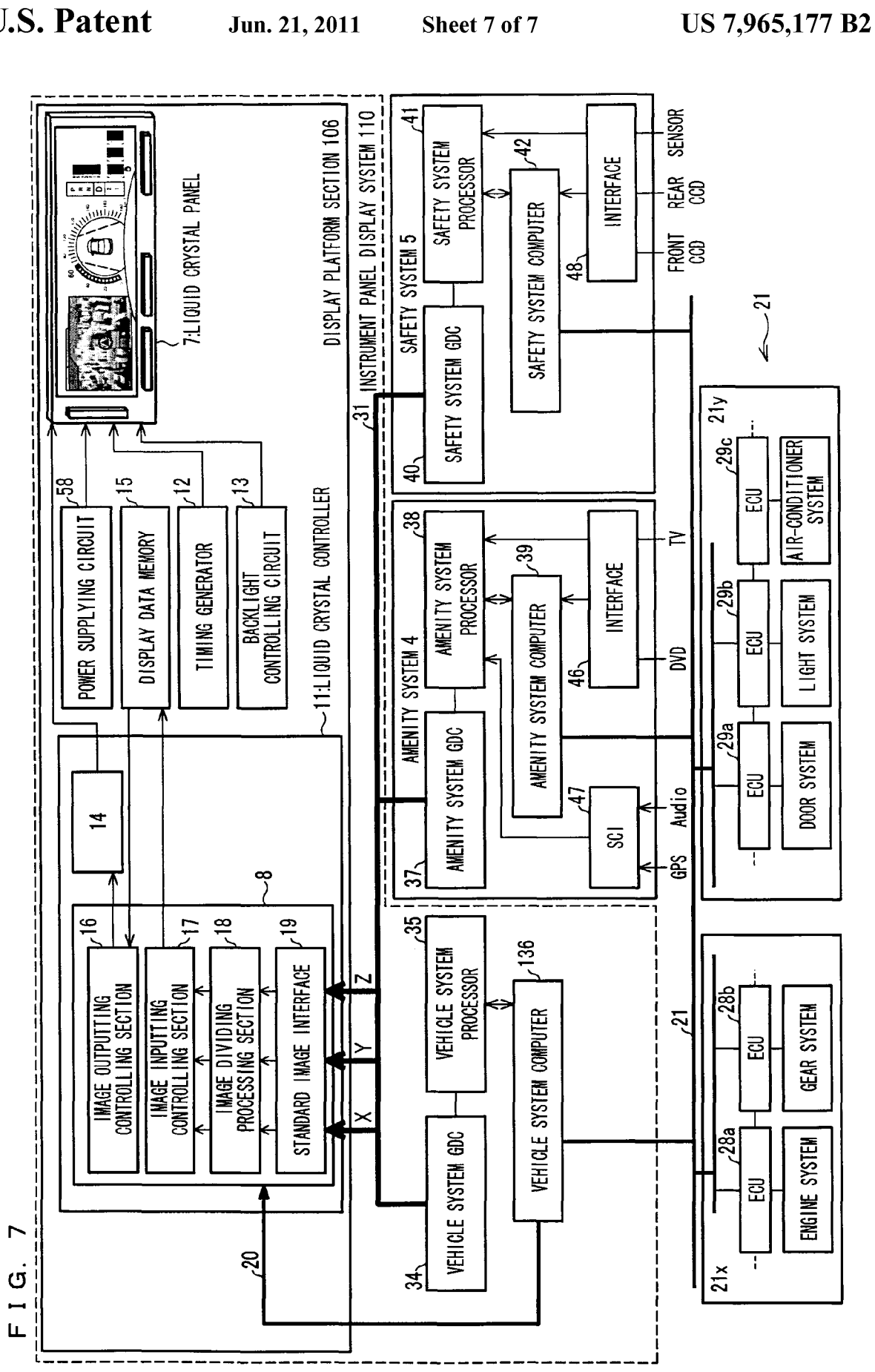
FIG. 7 is a block diagram illustrating an exemplary modification of the instrument panel control system illustrated in FIG. 1.

FIG. 7 illustrates yet another configuration of the instrument panel display system according to a preferred embodiment of the present invention. Members having identical functions are referenced by identical reference numerals. As FIG. 7 illustrates, an instrument panel display system 110 includes a display platform section 106, a liquid crystal panel 7, a vehicle system GDC 34, a vehicle system processor 35, and a vehicle system computer 136. In this regard, the present configuration (FIG. 7) can be said to have a configuration incorporating, into the instrument panel display system 110, the vehicle system 3 illustrated in FIG. 2 and assigning to the vehicle system computer 136, the functions of the DPF computer 9 illustrated in FIG. 2. In addition, a vehicle system computer 136, an amenity system computer 39, and a safety system computer 42 are directly connected to an in-car LAN 21.

The vehicle system computer 136 receives various vehicle data (vehicle data of the power train system and the body system) transmitted from the in-car LAN 21 for transmitting vehicle data, and transmits it to a vehicle system processor 35. In addition, the vehicle system computer 136 inputs the screen layout data and the image output control data into a multi-display real-time processing circuit 8 through a special line 20. Besides, the vehicle system computer 136 receives the image output control data transmitted from the amenity system computer 39 and the safety system computer 42 to an in-car LAN 21, and inputs it to the multi-display real-time processing circuit 8 through the special line 20.

The amenity system computer 39 receives the vehicle data directly from the in-car LAN 21 (the power train system in-car LAN 21x and the body system in-car LAN 21y), and transmits it to an amenity system processor 38. Likewise, the safety system computer 42 receives the vehicle data directly from the in-car LAN 21, and transmits it to a safety system processor 41.

According to this configuration (FIG. 7), the number of computers necessary for the instrument panel display system can be decreased since the functions of the DPF computer 9 illustrated in FIG. 2 are assigned to the vehicle system computer 136. In addition, since the vehicle system computer 136, the amenity system computer 39, and the safety system computer 42 are directly connected to the in-car LAN 21, the in-car LAN 32 for transmitting display control data illustrated in FIG. 1 becomes unnecessary, making designing of hardware (designing of wiring) easier.

Processing by the controlling sections of the multi-display real-time processing circuit 8 and by the sections of the screen design setting tool may be achieved by carrying out a program by using an arithmetic calculation device (e.g., CPU, MPU, DSP, or the like), the program being recorded on a recording device such as a ROM or RAM, or the above processing may be achieved by hardware performing the same process. Besides, by recording the program in a removable recording medium, the various functions and processing can be achieved in any computer.

The recording medium may be a memory (not illustrated; may be a ROM, for example) with which the microcomputer can perform the process. Moreover, the recording medium may be a program medium, which is readable with a program reading apparatus to which the program medium is inserted to be read, and which is provided as an external recording apparatus (not illustrated).

In either case, the stored program is preferably configured to be run by the microprocessor, which accesses thereto. Furthermore, it is preferable that the program be read out and then downloaded into a program recording area of the microcomputer, so that the program is performed. In this case, a downloading executing program is preliminarily stored in the body of the microcomputer.

The programming medium above may be a recording medium removable from its main body and fixedly carry the program. Examples of the recording medium encompass magnetic discs such as flexible disc and hard disc, discs such as CD, MO, MD, and DVD, card such as IC card (including memory card), and semiconductor memory such as mask ROM, EPROM (Erasable Programmable Read Only Memory), EEPROM (Electrically Erasable Programmable Read Only Memory), and flash ROM.

The present invention being thus described, the same way may be varied in many ways. Such variations are not to be regarded as a departure from the spirit and scope of the invention, and all such modifications as would be obvious to one skilled in the art are intended to be included within the scope of the following claims.

The display system of the present invention is widely useful for information display systems for use in a vehicle such as an automobile and a train, an airplane, a ship or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display system, which is to be mounted in a maneuverable moving object and displays an image that presents plural pieces of information including information regarding the moving object, the display system comprising:
   a combination image interface arranged to receive, from outside the display system, a single combination image in which a plurality of item images are combined with each other such that the item images are provided with predetermined sizes and positions within the single combination image;
   a combination image division section arranged to divide the single combination image into a plurality of image blocks such that each of the image blocks includes at least one of the item images;
   a layout data storage section arranged to store plural pieces of screen layout data to determine forms and positions of the image blocks, the plural pieces of screen layout data corresponding to respective states of the maneuverable moving object; and
   a display data generation section arranged to lay out the individual image blocks based on screen layout data corresponding to a state which the maneuverable moving object is in so as to generate display data, the screen layout data being selected from the plural pieces of screen layout data stored in the layout data storage section.

2. The display system as set forth in claim 1, wherein the screen layout data is settable manually and arbitrarily.

3. The display system as set forth in claim 1, wherein:
   the layout data storage section stores screen layout data corresponding to a running state, screen layout data corresponding to a stopping state, and screen layout data corresponding to a reversing state; and when the maneuverable moving object is in the running state, the display data generation section lays out the individual image blocks based on the screen layout data corresponding to the running state, when the maneuverable moving object is in the stopping state, the display data generation section lays out the individual image blocks based on the screen layout data corresponding to the stopping state, and when the maneuverable moving object is in the reversing state, the display data generation section lays out the individual image blocks based on the screen layout data corresponding to the reversing state.

4. The display system as set forth in claim 1, wherein:

the combination image division section divides each of a plurality of combination images into a plurality of image blocks such that each of the image blocks includes a single item image, the image blocks being laid out based on the screen layout data corresponding to the state which the maneuverable moving object is in, regardless of which combination image the image blocks belong to.

5. The display system as set forth in claim 4, wherein:

one of the plurality of combination images is a combination image including item images of speedometer, tachometer, shift lever position, voltage, oil temperature, fuel indicator, water temperature, and blinker, and another one of the plurality of combination images is a combination image including item images of left side image, right side image, rear left side image, rear center image, and rear right side image of the maneuverable moving object.

6. An instrument panel control system, comprising:

a combination image generation system arranged to generate a single combination image in which a plurality of item images are combined with each other; and a display system as set forth in claim 1, the display system arranged to generate display data based on the single combination image generated by the combination image generation system.

7. The instrument panel control system as set forth in claim 6, wherein the combination image generation system is a vehicle system arranged to generate the single combination image such that the plurality of item images are indicative of respective states of the maneuverable moving object.

8. The instrument panel control system as set forth in claim 6, wherein the combination image generation system is a safety system arranged to generate a single combination image in which a plurality of item images captured by respective image-capture means included in the maneuverable moving object are combined with each other such that the plurality of item images have predetermined sizes and positions.

9. A tangible computer-readable recording medium storing a computer program, when run on a computer, the computer performs a method comprising the steps of:

receiving a single combination image in which a plurality of item images are combined with each other such that the item images are provided with predetermined sizes and positions within the single combination image;

generating data for displaying an image on a display system from image data of the single combination image;

cutting out individual ones of the plurality of item images as image blocks from the image data of the single combination image;

storing plural pieces of screen layout data to determine forms and positions of the image blocks, the plural pieces of screen layout data corresponding to respective states of a maneuverable moving object; and laying out the individual image blocks based on the screen layout data corresponding to a state which the maneuverable moving object is in so as to generate display data, the screen layout data being selected from the plural pieces of screen layout data stored in the step of storing.

* * * * *